March 22, 1938. A. DE MATTEIS 2,112,076
TOASTER
Original Filed Nov. 14, 1935   4 Sheets-Sheet 1
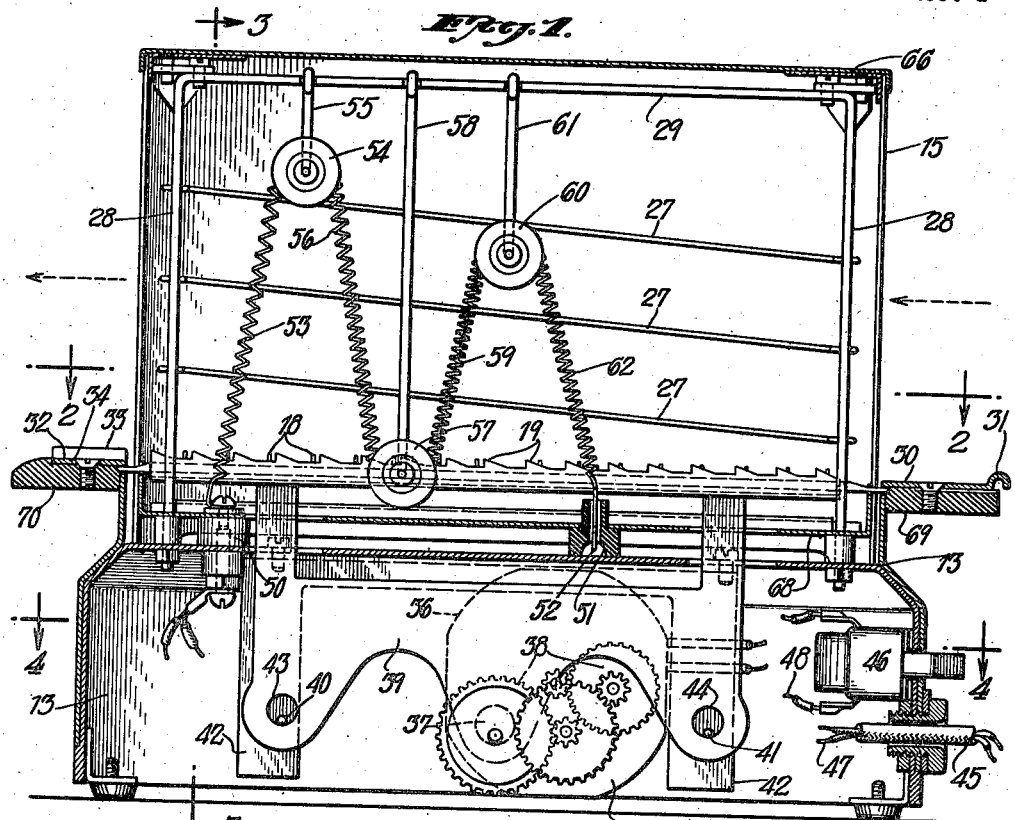
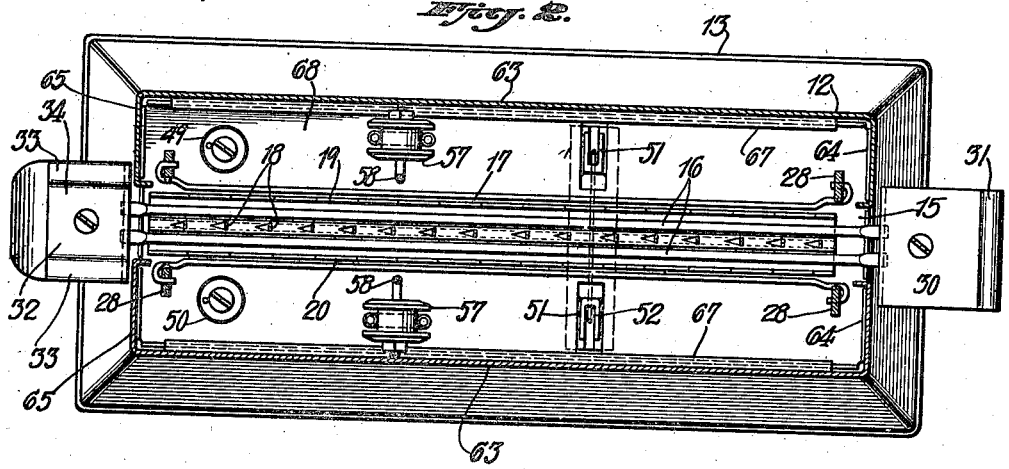
INVENTOR.
ALFREDO DE MATTEIS.
BY
ATTORNEYS

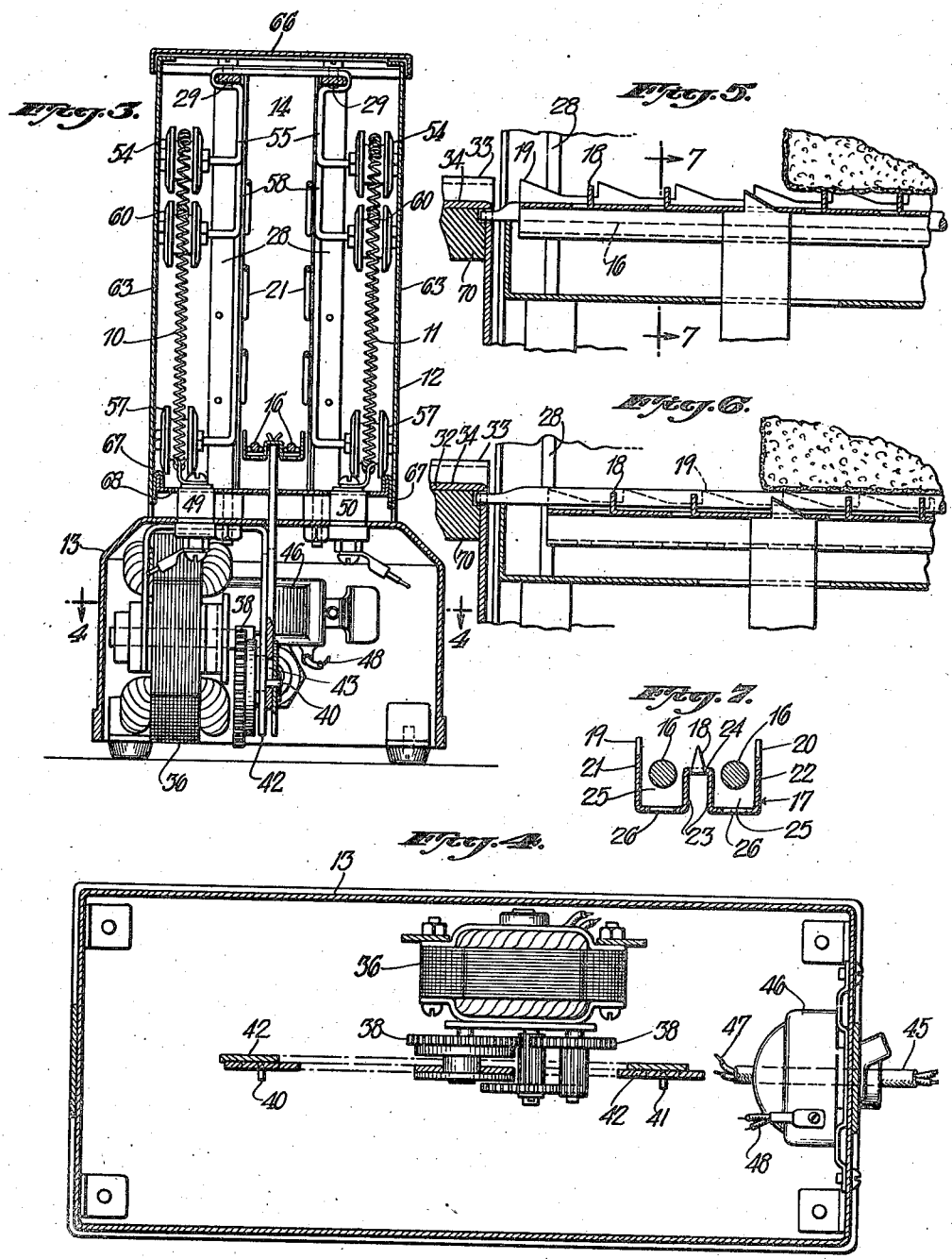

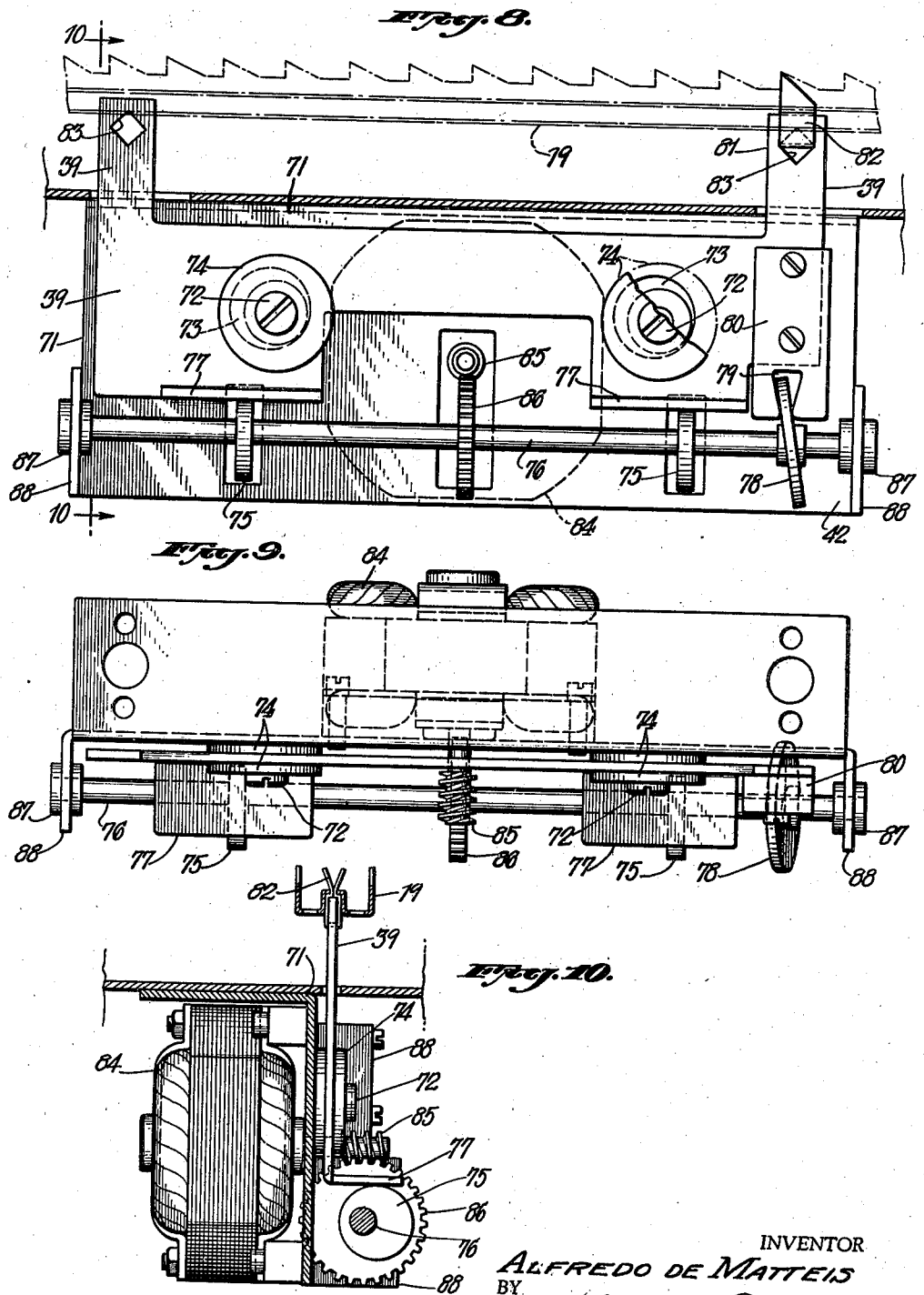

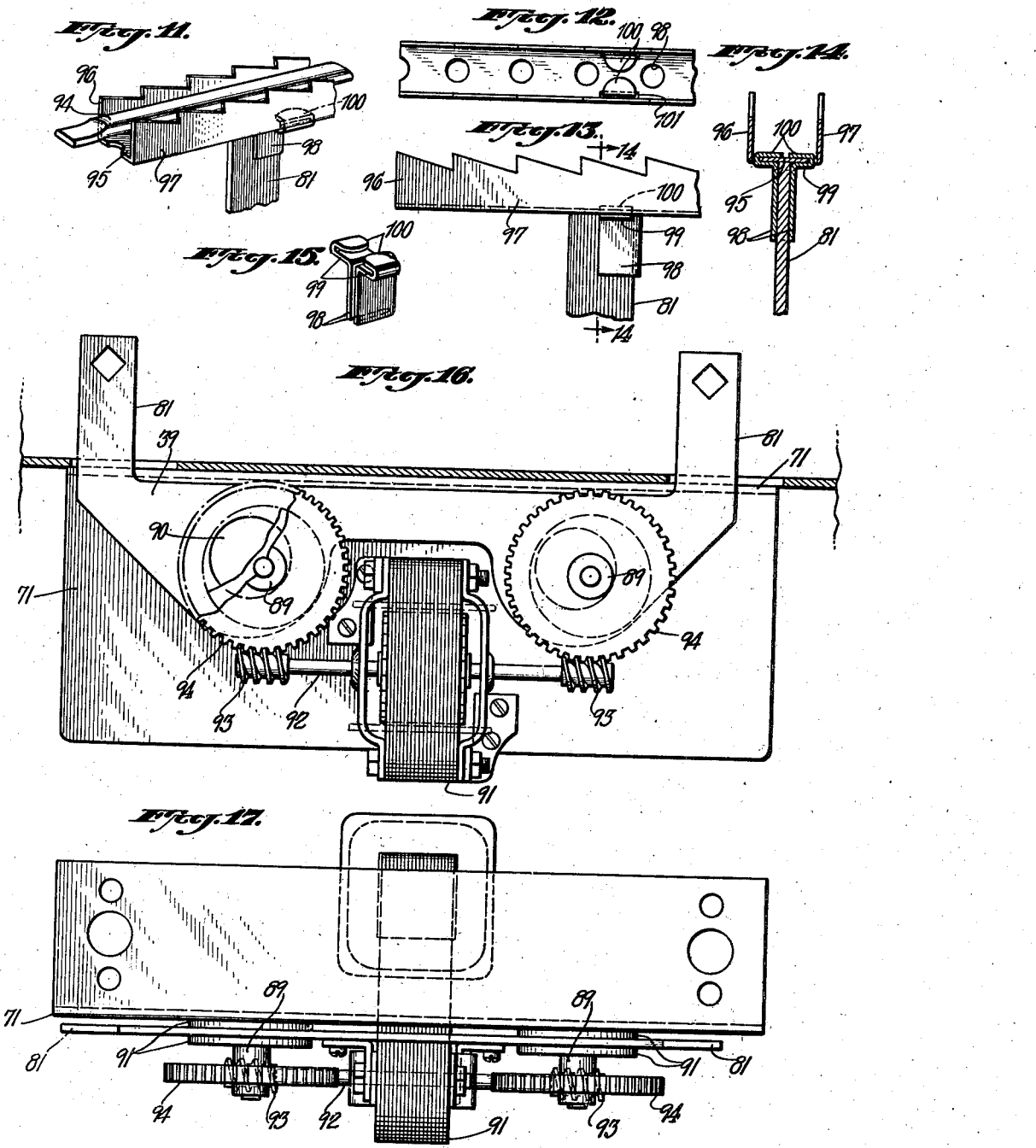

Patented Mar. 22, 1938

2,112,076

UNITED STATES PATENT OFFICE 2,112,076

TOASTER

Alfredo De Matteis, Valley Stream, N. Y., assignor to Toastolator Company, Inc., New York, N. Y., a corporation of New York Original application November 14, 1935, Serial No. 49,680. Divided and this application June 1, 1936, Serial No. 82,788

9 Claims. (Cl. 219—19)

My invention relates to a toaster of the household type, the present application being a division of application Serial No. 49,680 filed November 14, 1935.

In toasters of this type, as heretofore constructed, the slice of bread to be toasted has been held stationary between a pair of fixed heating elements. In some cases the bread is automatically ejected from the toaster after a predetermined time, which may be adjusted to obtain varying degrees of toasting. Apparatus of this type has the disadvantages that parts of the bread may be subjected to a more intense heating than others and also that parts shielded by holding members may not be toasted or browned at all. Moreover, in case the automatic ejecting device may fail to work properly, the bread will be toasted too much or not enough, as the case may be.

These various disadvantages are avoided in my present invention in which the bread to be toasted is conveyed by a simple and compact mechanism through a toasting zone in which each succeeding area of the bread is given a uniform heat treatment, and in which the degree of toasting may be easily controlled or regulated as required.

In my invention the bottom edge of a slice of bread to be toasted is placed on a pair of longitudinally extending parallel rails and the toast is intermittently lifted and carried forwardly between heating elements by a conveying mechanism which rises between the rails, moves forward a limited space, then drops below the rails and returns to its original position. In this way the toast is repeatedly lifted from one position on the supporting rails, carried forwardly and again deposited on the rails until it has passed from between the heating elements. Guides are provided to prevent the toast from falling sidewise against the heating elements but, in passing, the position of these guides changes continuously with respect to the exposed areas of the bread so that no part of the bread is covered throughout by the guides but is exposed uniformly to the heating elements. Suitable supports are provided for the insertion of the bread and discharge of the toast. The time of toasting and thus the extent of browning may be controlled by moving the bread to different positions on the conveyor device as it is inserted in the toaster.

The various features of the invention are illustrated by way of example in the accompanying drawings, in which—

Fig. 1 is a vertical longitudinal section of a toaster embodying a preferred form of the invention.

Figs. 2 and 4 are horizontal sections on the lines 2—2 and 4—4 of Fig. 1.

Fig. 3 is a vertical section on the line 3—3 of Fig. 1.

Figs. 5 and 6 are detail views of the conveyor mechanism and a slice of bread being toasted, showing the position of the bread in different positions of movement.

Fig. 7 is a cross section on the line 7—7 of Fig. 5.

Fig. 8 is a side elevation, Fig. 9 a plan and Fig. 10 a vertical section on the line 10—10 of Fig. 8 of a modified form or embodiment of the invention.

Figs. 11, 12, 13 and 14 are, respectively, perspective, plan, side elevations and cross section on the line 14—14 of Fig. 13 of a modified bread conveying or moving element of the invention.

Fig. 15 is a detail of a clip forming an element of the embodiment shown in Figs. 11 to 14 inclusive.

Figs. 16 and 17 are, respectively, side elevation and plan of another form of embodiment of the invention.

Referring to the toaster illustrated in the accompanying drawings, more particularly to Figs. 1 to 7 inclusive, the bread to be toasted is carried between a pair of electric resistance heating elements 10 and 11 mounted within an enclosure 12 on a base 13 on opposite sides of a bread conveying passageway 14. Bread to be toasted is inserted through an opening 15 in the wall or casing 12 at the right as shown in Figs. 1 and 2, and rests, in whole or in part, on a supporting and conveying mechanism which comprises a pair of spaced rails 16 extending longitudinally at the bottom of the conveying space 14.

The conveying mechanism also comprises a movable member 17 having a series of spaced upstanding projections 18 between the rails 16 and projections 19 and 20 on opposite sides of the pair of rails. This conveyor member may be made in any suitable manner of any suitable material. For example, it may be made of a strip of metal having the edge portions 21 and 22 bent upwardly and serrated at their upper edges to form the projections 19 and 20. The longitudinal central part is also pressed upwardly to form a pair of upwardly extending walls 23 joined at their upper edges by a flat horizontal area 24 from which the teeth 18 are formed by cutting and punching the metal upwardly at spaced intervals. This construction provides channels 25 in which the rails 16 are received during the movements of the member 17. Openings 26 are provided at intervals in the bottom of the channels 25, from which crumbs or particles of bread or toast may fall and thus maintaining the toasting passage free from accumulation of crumbs.

The bread passing through the toasting passage is held upright by means of longitudinally extending bars 27 mounted at their opposite ends in uprights 28 which are mounted in the base 13 and joined at their upper ends by a longitudinally extending bar 29. The bars 27 may be of any suitable shape and form and are preferably straight and slightly inclined so that areas of the bread, which in one position are shielded from the heating elements by the bars, are exposed upon passing to a different position in the toasting passage.

At the entrance end a feeding platform 30 is provided on which the bread to be toasted may rest in part as it is positioned in the entrance end of the toasting passage. The outer edge of the platform 30 is raised slightly in the transverse ridge 31 so as to bring the weight of the slice of bread forwardly of its point of support on the platform and thus enable the moving elements 17 to take the weight of the slice and advance it into the toasting passage. A platform 32 is also provided at the exit end of the toasting passage. This platform 32 has raised edge portions 33 to provide a central channel 34 to guide the finished toast in a direct line as it leaves the toasting passage. The outer edge of the platform 32 is also curved downwardly at 35 to cause the toast to fall forwardly out of the toasting passage as its weight is received on the platform 32.

The period of time to which a slice of bread is subjected to the heating elements may be controlled by the extent to which it is pushed into the toasting passage. If it is found that the bread is toasted more than is desired, it is thereafter only necessary to push the slice further into the toasting passage. If, on the other hand, the toasting is not as great as desired, the bread will not be pushed into the toasting passage as far. The projections 19 and 20 are therefore made of a saw tooth shape to enable the bread to be pushed in one direction and ride over the projections, but to be engaged and pushed further in this direction by the movement of the elements 17. This method of controlling the degree of toasting has the advantage that it is direct and easily understood and regulated.

The moving element 17 may be given a required movement by any suitable mechanism. In the embodiment shown by way of example, this movement is one of combined translation and rotation, one point of the element 17 being given a rotating movement and other points being guided in the same rotational movement so that each element of the member 17 in any one position is always parallel to its position in any other part of the movement. The element 17 is driven in its movement by means of an electric motor 36 mounted in the base 13 of the toaster and driving an eccentric 37 through a speed reducing gear frame 38. The eccentric 37 is journalled in a vertical plate 39 which extends upwardly between the walls 23 of the elements 17 and is secured thereto. The rotation of the eccentric 37 thus lifts and lowers the plate 39 and with it the moving element 17. The plate 39 is held in vertical position by means of pins 40 and 41 mounted on bracket arms 42 depending from the upper part of the base 13 and entering openings 43 and 44 respectively, in the plate 39. The relation of the pins 40 and 41 to the openings 43 and 44 respectively, is the same as that of the center of the eccentric 37 to the opening in which it is journalled, so that the plate 39 moves simultaneously in the same direction as the eccentric 37 and in the openings 43-44 and thus maintains a parallel relation to any other position in its movement. The motor 36 may be energized by current taken from the entrance cord or cable 45 through the switch 46 and wires 47 in parallel relation to wires 48 connecting the switch 46 to the heating elements.

The heating elements 11 may be of any suitable construction and arrangement. Preferably they are formed of spirally wound wire and the elements on opposite sides of the toasting passage are arranged in series. The heating elements 10 and 11 are preferably identical or similar, the elements 10 being connected at one end to the binding terminal 49 and one end of the heating element 11 being connected to a binding terminal 50. The binding terminals 49 and 50 are connected by the wire 48 to the switch 46. The opposite ends of the heating elements pass downwardly through insulators 51 and join in the connecting length of wire 52.

The length of spiral wire 53 extending upwardly from the terminal 49 or 50 passes over an insulator 54, such as a porcelain spool, suspended by a hanger 55 from the horizontal bar 29, and thence downwardly in a length 56 to and under an insulating spool 57 mounted on a hanger 58 from the cross-bar 29. Thence it extends upwardly in a length 59 over the spool 60 suspended on the hanger 61 and downwardly in a length 62 to the connecting cross-wire 52. The spool 60 is arranged at a lower level than the spool 54 and the coils of the spirals 59 and 60 are more closely spaced so as to provide greater liberation of the heat in the lower part of the toasting passage. This results in a more even distribution of heat, for the heated air rises about the heating elements to the extreme upper part of the passage and renders radiating heat elements unnecessary at this point. Moreover, the bread near the bottom of the slice is generally denser than near the upper crust, and requires greater application of heat. The result is that the heat is distributed in proportion to the absorbing capacity of the bread. As the slice passes past the hanger elements 61 it has been partly dried and its surface is in position to take a uniform toasting and the heating effect is correspondingly reduced and distributed throughout the entire height of the slice.

The heating effect is, therefore, proportioned to give a uniform toasting effect throughout the exposed surfaces of the slice. Inasmuch as the toasting effect will depend upon the length of time of heating the toast, this time may be shortened by pushing the bread further into the toasting channel, or lengthened by placing it at the extreme outer part. The repeated movements of the bread being toasted also tends to maintain a uniform toasting effect.

The tosting elements may be enclosed in an enclosure which comprises a pair of side walls 63 having end walls 64 and 65 that are inturned toward the toasting passage and terminate in approximate alignment with the guides 27, so as to define the entrance and outlet to and from the toasting passage. The top part of the enclosure is formed by a top or cover plate 66 which is secured to the side plates 63 by screws, or other suitable means, and which are also secured to the uprights 28 and the cross-bar 29 by suitable securing means. The lower edges of the side walls 63 are held in position by down-turned strips 67 that fit over the up-turned edges of the plate 68 mounted on the base 15. Insulating plates 69 and 70 are mounted on the under surface of the platforms 30 and 32 to enable these platforms to act as handles, without danger of being burnt should the platforms be heated.

In the modification shown in Figs. 8, 9, and 10 the plate 39 carrying the toast supporting and lifting elements is slidably secured to one side of a depending plate 71, which corresponds in position to the elements 42 of Fig. 1, by means of a pair of studs 72 which project from the plate 71 through openings 73 in the plate 39 and pairs of washers 74. The openings 73 are of a diameter greater than the diameter of the studs 72 to permit an oscillating motion about the studs. This oscillating motion is imparted to the plate 39 by means of a pair of cams 75 mounted on a rotating shaft 76 and acting against horizontal flanges 77 projecting sidewise from the lower edge of the plate 39 to alternately lift and lower the plate 39 in recurrent cycles. A cam 78 is also mounted on the shaft 76 and projects into a slot 79 on a plate or bracket 80 on the plate 39, and is so inclined as to shift the plate 39 forwardly in its uppermost position, and backwardly or in a return movement in its lowermost position. As a result, the plate 39 is lifted so as to lift the toast above the supporting rail or rails, move it forwardly, then drop to permit the toast or bread to rest on the supporting rail, and then return to its original position. The toast supporting member 19 may be mounted on upward projections 81 of the plate 39 by means of clips 82 which pass through openings 83 in the projections 81 and then are bent tightly against the sides of the element 19 or a part thereof. The shaft 76 may be driven by any suitable driving motor through any suitable transmission mechanism.

By way of example, such mechanism is illustrated as comprising a motor 84 mounted on the side of the plate 71 opposite the plate 39 and having an arbor or shaft extending therethrough, and provided with a worm 85 which meshes with a gear 86 keyed to the shaft 76. The shaft 76 may be mounted in suitable bearings 87 in brackets 88 at opposite ends of the plate 71.

In the modification of the invention shown in Figs. 16 and 17, the oscillating or carrying plate 39 is slidably mounted on the supporting plate 71 by means of a pair of shafts 89 and eccentrics 90 keyed on the shafts and fitting the openings in the plate 39. The plate 39 is held in suitably spaced relation to the plate 71 by means of pairs of washers 91, one pair for each of the shafts 89. The eccentrics 90 are mounted in the same angular relation to their respective shafts 89 and consequently rotate their respective ends of the plate 39 in the same phase so that the plate 39 is lifted, carried forwardly, dropped and returned to its original position with each complete rotation of the shafts 89. The shafts 89 are driven in synchronism by means of a motor 91 mounted on the plate 71 and having a shaft 92 that extends from each end of the motor 91, and carries on the projecting ends worms 93 which mesh with gears 94 keyed on their respective shafts 89 so that the gears 94 and shafts 89 and cams 90 rotate at the same speed and in the same phase or cycle.

The toast or bread conveying mechanism shown in Figs. 11 to 15 inclusive, and which is an improved form of the mechanism shown in Fig. 7, comprises a single flat bar 94 mounted at its opposite ends in the platforms 69 and 70 in a manner similar to the mounting of the rods 16 as shown in Fig. 1. The lifting and carrying mechanism comprises a trough-shaped metallic sheet or strip bent to form a bottom plate 95 and a pair of upwardly extending side plates 96 and 97, the upper edge of which is saw toothed. The openings 98 are formed in the bottom plate 95. The bottom plate 95 is secured on upwardly projecting ends of the actuating mechanism, such as the upward projections of the plate 39 in any of the modifications, by means of a clip having a downwardly depending shank bent to form a pair of slightly spaced leaves 98 which grip the opposite sides of the upward projections 81 of the plate 39, and having a pair of horizontal leaves 99 projecting on opposite sides of the leaves 98. The book elements 100 extend upwardly from the horizontal leaves 99 through openings 101 in the bottom plate 95 and are then pressed downwardly to engage and grip the bottom plate 95.

The above arrangement provides a somewhat simpler mechanism for supporting and conveying the bread to be toasted.

What I claim is—

1. A toaster comprising a pair of heating elements spaced to provide a toasting passage, a pair of supporting rails in said passage, conveyor elements between and outside of said rails, and means cyclically to lift said elements to project above the surface of said rails, move them forwardly, lower them to their original level and return them to their original position.

2. A toaster comprising a pair of heating elements spaced to provide a toasting passage, a pair of spaced supporting rails extending longitudinally at the base of said passage, a strip extending longitudinally below said rails and having projections extending upwardly, means to move said strip cyclically to lift the points of said projections above the upper surfaces of said rails, to move said strip forwardly, lower it to its original level and return it to its original position.

3. A toaster comprising a pair of heating elements spaced to provide a toasting passage, a pair of spaced supporting rails extending longitudinally at the base of said passage, a strip extending longitudinally below said rails and having projections extending upwardly, means to move said strip cyclically to lift the points of said projections above the upper surfaces of said rails, to move said strip forwardly, lower it to its original level and return it to its original position, said strip having openings to permit particles to fall therethrough.

4. A toaster comprising a pair of heating elements spaced to provide a toasting passage, a pair of spaced supporting rails extending longitudinally in the lower part of said passage, conveyor means having parts movable cyclically in a longitudinally plane relative to said rails to lift a slice to be toasted from said rails, move it forwardly a limited distance and deposit it on said rails.

5. A toaster comprising a pair of electric heating elements spaced to provide a heating passage, a pair of spaced longitudinally extending supporting rails in the spaced portion of said passage, a conveyor means to lift a slice from said rails, move it forwardly and deposit it on said rails in recurrent cycles, said heating elements comprising heating wires passing between upper and lower supports, the upper supports nearer the entrance end of said passage being lower than those toward the exit ends thereof.

6. A toaster comprising a toasting passage, means to move a slice of bread to be toasted through said passage in successive small movements, inclined guide rails at opposite sides of said passage, and a pair of heating elements, one at each side of said passage outside of said guide rails, said heating passages being arranged in vertically extending loops arranged in longitudinal succession with loops nearer the entrance end of said toasting passage extending upwardly to lower levels than the loops toward the exit end thereof.

7. A toaster comprising an elongated casing providing a cooking zone, a fixed support member to directly engage an edge of a mass of toastable material in the casing to normally support the mass, and a feeding element for intermittent operation directly against the mass at said edge to engage and support the mass alternately with the support member while advancing the mass through the cooking zone for predetermined distances which are less than the length of the cooking zone whereby the mass may be progressively toasted as it is advanced through the cooking zone.

8. In a bread toaster, a frame, means carried by said frame and forming a narrow vertical passageway open at its ends, said means including a way upon which the bread travels on edge, said way having a slot therein, an auxiliary frame, a feed mechanism carried by said auxiliary frame and including a feed bar having dogs thereon adapted to extend through the slot and to engage the bread on said way, a crank carried by said auxiliary frame and engaging said feed bar at one locality to give said feed bar a circular movement, a guide engaging said feed bar at one locality to give the feed bar a parallel movement, means carried by the auxiliary frame for operating said crank, and means for toasting the bread during its passage through the passageway.

9. A toaster comprising a pair of heating elements spaced to provide a toasting passage, supporting means extending longitudinally in the lower part of said passage to support a slice of bread on edge and means having parts movable cyclically in a longitudinal plane relative to said rails periodically to lift said slice of bread, move it forwardly a limited distance less than the length of said passage and deposit it on said support.

ALFREDO DE MATTEIS.